US010384938B2

(12) United States Patent
Costello

(10) Patent No.: US 10,384,938 B2
(45) Date of Patent: Aug. 20, 2019

(54) OZONE GENERATOR

(75) Inventor: Trevor Franklin Costello, Wallingford (GB)

(73) Assignee: Aqua21 Limited, Edinburgh (GB)

( * ) Notice: Subject to any disclaimer, the term of this patent is extended or adjusted under 35 U.S.C. 154(b) by 463 days.

(21) Appl. No.: 14/423,406

(22) PCT Filed: Aug. 24, 2012

(86) PCT No.: PCT/GB2012/052101
§ 371 (c)(1),
(2), (4) Date: May 29, 2015

(87) PCT Pub. No.: WO2013/030559
PCT Pub. Date: Mar. 7, 2013

(65) Prior Publication Data
US 2015/0259203 A1 Sep. 17, 2015

(30) Foreign Application Priority Data

Aug. 26, 2011 (GB) .................................. 1114828.5
Jan. 13, 2012 (GB) .................................. 1200575.7

(51) Int. Cl.
C01B 13/11 (2006.01)
B01J 19/08 (2006.01)
(Continued)

(52) U.S. Cl.
CPC ............. *C01B 13/11* (2013.01); *B01J 19/087* (2013.01); *C02F 1/78* (2013.01);
(Continued)

(58) Field of Classification Search
CPC . C01B 13/11; C01B 2201/12; C01B 2201/22; C01B 2201/34; C01B 2201/40;
(Continued)

(56) References Cited

U.S. PATENT DOCUMENTS

| 4,626,876 A | * | 12/1986 | Miyagawa | ......... G03G 15/0275 347/127 |
| 5,411,713 A | * | 5/1995 | Iwanaga | .................. C01B 13/11 204/176 |
| 5,614,151 A | * | 3/1997 | LeVay | ....................... A61L 2/10 250/455.11 |
| 6,143,823 A | * | 11/2000 | Wehrmann | .............. C08L 67/00 524/275 |
| 2007/0154365 A1 | | 7/2007 | Matsuno | |
| 2008/0025883 A1 | * | 1/2008 | Liou | ....................... C01B 13/11 422/186.04 |

FOREIGN PATENT DOCUMENTS

| EP | 1870974 A1 | 12/2007 |
| WO | 0209869 A1 | 2/2002 |
| WO | 03043932 A1 | 5/2003 |

OTHER PUBLICATIONS

Response to Examination Report dated Jan. 25, 2017, from counterpart European Application No. 12768884.4, filed on May 24, 2017, 22 pp.
(Continued)

*Primary Examiner* — Xiuyu Tai
(74) *Attorney, Agent, or Firm* — Shumaker & Sieffert, P.A.

(57) ABSTRACT

An ozone generator (1) is presented comprising a body (2), a first electrode (4), a second electrode (6), an elongate channel within the body extending between the first and second electrodes, an inlet (10) and an outlet (12); the elongate channel being in fluid communication with the inlet and the outlet; the elongate channel isolated from each of the first and second electrodes by a respective dielectric layer (22, 24), whereby an electric field can be generated across the elongate channel between the first and second electrodes. The presented ozone generator allows small quantities of ozone to be produced for use in small scale water treatment. In addition, a method of producing ozone is presented using an ozone generator according to the invention.

23 Claims, 7 Drawing Sheets

(51) Int. Cl.
*C02F 1/78* (2006.01)
*C02F 103/00* (2006.01)

(52) U.S. Cl.
CPC ... *B01J 2219/0875* (2013.01); *C01B 2201/12* (2013.01); *C01B 2201/22* (2013.01); *C01B 2201/34* (2013.01); *C01B 2201/40* (2013.01); *C01B 2201/62* (2013.01); *C01B 2201/64* (2013.01); *C02F 2103/003* (2013.01); *C02F 2201/48* (2013.01); *C02F 2303/04* (2013.01); *C02F 2305/02* (2013.01)

(58) Field of Classification Search
CPC ............ C01B 2201/62; C01B 2201/64; C01B 2201/76; C01B 2201/72; C01B 2201/90; C01B 2201/32; C01B 2201/14; C01B 2201/80; B01J 19/087; B01J 2219/0875; B01J 19/088; B01J 2219/0807; C02F 1/78; C02F 2103/003; C02F 2201/48; C02F 2303/04; C02F 2305/02; H01T 23/00
See application file for complete search history.

(56) References Cited

OTHER PUBLICATIONS

Communication pursuant to Article 94(3) EPC from counterpart European Application No. 12768884.4, dated Jan. 25, 2017, 4 pp.
Response to Communication pursuant to Article 94(3) EPC dated Jan. 25, 2017, from counterpart European Application No. 12768884.4, filed on Oct. 16, 2015, 5 pp.
Kirschner, "Ozone," Ullmann's Encyclopedia of Industrial Chemistry, vol. 25, Jun. 15, 2000, pp. 637-645.
International Search Report and Written Opinion from counterpart International Application No. PCT/GB2012/052101, dated Jan. 2, 2013, 5 pp.

* cited by examiner

OZONE GENERATOR

FIELD OF THE INVENTION

The invention relates to an improved apparatus for the generation of ozone, in particular for use in the sterilisation of water.

BACKGROUND TO THE INVENTION

Sterilisation, such as sterilisation of a water supply, is of great importance generally, and especially in health care institutions such as hospitals, for example, where the water is to be used by patients who may be vulnerable to infection by water borne species.

Therefore, it is necessary to provide means by which water supplies may be sterilised and made contaminant free. There are a number of methods by which a water supply for a health care institution may be sterilised, including the use of radiation in the ultra violet region of the spectrum and chemicals such as chlorine, or ozone.

The use of ultra violet radiation requires any microbe within the water supply to be treated to be in direct line of sight of the radiation source for a sufficiently long period of time to ensure that the radiation is able to break down the microbe's cell wall. As such, the period of exposure and the distance from the radiation source are important factors that determine the efficacy of the treatment.

The use of chlorination to treat water has effectively reduced the incidence of waterborne disease but has a number of side effects. For example, if any naturally occurring organic compounds are present, chlorine will react to form potentially carcinogenic compounds, such as trihalomethanes and haloacetic acids.

The use of ozone ($O_3$) has a number of benefits. Ozone is an extremely reactive allotrope of oxygen and will react with most contaminants in water, including viruses and bacteria. The high reactivity of ozone means that the lifetime of ozone within water is relatively short, before it will break down to form oxygen and water. In addition, the products of ozone reactions are generally harmless. However, the production of ozone is energetically expensive, generally requiring large equipment and power supplies. Therefore, ozone is typically only used for large scale sterilisation of a water supply in health care institutions such as hospitals, for example, where the cost of the equipment is justified by the volume of water that will be treated.

As such, ozone generators on the market are generally large, bulky devices and are designed for large throughput applications where large quantities of ozone are required to be produced. For example, a typical ozone generator comprises a metallic block through which a serpentine channel runs along which high pressure gas is forced to flow.

The metallic block is constructed to withstand large pressures of gas being forced along the serpentine channel and the large temperatures generated within the said serpentine channel. In addition, large dedicated power supplies are required, both adding to the expense of the system and making them unsuitable for treatment of small scale water supplies.

Accordingly, it is an object of the invention to provide an ozone generator that is suitable for sterilisation (for example, water treatment) that may be made cost effectively, is able to produce ozone efficiently and is scalable for small or large scale operations.

SUMMARY OF THE INVENTION

According to a first aspect of the invention there is provided an ozone generator comprising a body, a first electrode, a second electrode, an elongate channel within the body extending between the first and second electrodes, an inlet and an outlet; the elongate channel being in fluid communication with the inlet and the outlet; the elongate channel isolated from either or both of the first and second electrodes by at least one dielectric layer, whereby an electric field can be generated across the elongate channel between the first and second electrodes.

Preferably, the elongate channel is linear between the first and second electrodes.

The ozone generator according to the first aspect of the invention is a dielectric barrier discharge generator. Electrons crossing between the two electrodes in an electrical discharge interact with the oxygen molecules within the volume of the electrical discharge in the elongate channel to produce ozone, $O_3$, by the following general reaction scheme;

$$e^- + O_2 \rightarrow 2\dot{O} + e^-$$

$$\dot{O} + O_2 + M \rightarrow O_3 + M$$

where M is a third collision partner, such as $N_2$ or $O_2$, for example.

One problem with large scale ozone generators is that they have long serpentine channels and much of the ozone generated in the first portion of the channel is likely to have been destroyed by collisions with either other molecules within the gas, or with the walls of the generator before it exits the generator. Therefore, the provision of an elongate channel which is linear between the first and second electrodes ensures that a higher proportion of ozone generated within the elongate channel exits the elongate channel via the outlet than for large scale ozone generators.

The elongate channel may be isolated from each of the first and second electrodes by a respective dielectric layer.

Preferably, the first and second electrodes are planar. The first and second electrodes may each comprise a sheet of conductive material.

The first and second electrodes may be metallic. The first and second electrodes may be copper or aluminium, for example.

The first and second electrodes may comprise an organic conductor, such as a graphite or graphene sheet, or a conducting polymer such as poly(acetylene), poly(p-phenylene vinylene) or poly(pyrrole), for example.

The or each dielectric layer may be a coating on the surface of the first and or second electrodes. The or each dielectric layer may be a sheet of dielectric material located between the elongate channel and the first and or second electrodes.

In embodiments where the elongate channel is isolated from the first electrode by a dielectric layer, the dielectric layer may be a plastics material. In embodiments where the elongate channel is isolated from the second electrode by a dielectric layer, the dielectric layer may be a plastics material. The or each dielectric layer may comprise polycarbonate, for example.

Alternatively, the or each dielectric layer may comprise a non-plastics non-conducting material such as alumina, for example.

The ozone generator may be made using dielectric plates within which the electrodes are sandwiched. For example, the dielectric plates may comprise polycarbonate and the electrodes may be copper plates. Alternatively, the ozone generator may be formed in one piece using 3D printing, for example.

Reactive species within the gas flowing along the elongate channel, such as ozone for example, may react with the material of the first and second electrodes of ozone generators that allow the gas within the channel of the ozone generator to directly contact the first and second electrodes. In addition, if the gas within the channel becomes sufficiently ionised, the said ions may distribute charge from one electrode to the other, thereby creating a current between the first and second electrodes and thereby affecting or potentially preventing the electric discharges across the channel necessary for the production of ozone. Therefore, the provision of a dielectric layer isolating the elongate channel from at least one of the first and second electrodes protects the said electrodes from the gas flowing along the elongate channel and may prevent the formation of an undesired current being produced between the two electrodes.

The elongate channel may have a length, a width and a depth. The elongate channel may have an aspect ratio (length to width) of at least 1.5 to 1. The elongate channel may have an aspect ratio of at least 2 to 1. The elongate channel may have an aspect ratio of at least 3 to 1.

The elongate channel may have a generally rectangular cross section (orthogonal to its length), the rectangular cross section having a width and a depth. The width of the elongate channel may be greater than the depth of the elongate channel.

The depth of the elongate channel may be less than 6 mm. The depth of the elongate channel may be less than 4 mm. The depth of the elongate channel may be less than 2 mm. The depth of the elongate channel may be less than 1 mm. For example, the depth of the elongate channel may be 0.5 mm.

The elongate channel is generally free of obstructions in the gas pathway. Preferably, the elongate channel is configured to minimise turbulent flow. The elongate channel may be free of obstructions (e.g. obstructions around which gas may turbulently flow). For example, the elongate channel may lack support posts within the gas pathway.

There may be substantially no boundary layer at the surface of the walls of the elongate channel such that gas flowing along the elongate channel adjacent to the edges of the channel flow at the same rate as gas flowing in the centre of the channel, that is, the gas has a flow profile approximating plug flow.

Gas flowing along the elongate channel may form a laminar flow such that layers within the gas flowing along the elongate channel do not interact.

Typically, the fluid flowing through the elongate channel has a Reynolds number of less than 15,000. The fluid flowing through the elongate channel may have a Reynolds number of less than 10,000. The fluid flowing through the elongate channel may have a Reynolds number of less than 5,000.

The Reynolds number may be reduced by dividing the flow of fluid before it enters the device, and passing the divided fluid flows into a plurality of elongate channels. Accordingly, the volume of fluid flowing through each channel is reduced, reducing the volumetric flow rate, and therefore reducing the Reynolds number for each elongate channel within the plurality of elongate channels. For example, an array of elongate channels may be arranged adjacent to each other such that each elongate channel extends between the same first and second electrodes. Alternatively, an array of elongate channels may be arranged one above the other in a stack such that each elongate channel extends between different electrodes, such as a first elongate channel extending between a first and second electrode, a second elongate channel extending between the second and a third electrode and so on.

The divided flow may be recombined after passing through the plurality of elongate channels.

Ozone is a highly reactive molecule and therefore it is desirable to have as few collisions and interactions of any ozone molecules formed within an ozone generator before the ozone exits through the outlet. Therefore, the provision of an elongate channel through which gas flows in a non-chaotic manner, there will be fewer interactions of the molecules within the gas and therefore, a higher proportion of ozone molecules produced within the ozone generator will survive to the outlet of the ozone generator.

The first and second electrodes may extend beyond the width of the elongate channel. The provision of electrodes extending beyond the width of the elongate channel may ensure that the non-linear electric field around the edges of the first and second electrodes do not extend across the elongate channel.

The body of the ozone generator may have a first surface and a second surface, where the first surface may be at the top of the body during use and the second surface may be at the bottom of the body during use. The inlet may extend from the first surface of the body to the first end of the channel, and the outlet may extend from the second end of the channel to the second surface such that the direction of flow through the inlet and outlet is generally normal to that in the channel.

The inlet may be a continuation of the elongate channel, extending to the exterior of the body such that gas entering the inlet is not required to change the direction of flow to enter the elongate channel from the inlet. The outlet may be a continuation of the elongate channel such that gas exiting the elongate channel is not required to change the direction of flow to enter the outlet from the elongate channel. The elongate channel may extend straight through the body in a straight line.

The body may comprise at least one void space intermediate the exterior of the body and the surface of the electrodes. The at least one void space may extend from the exterior of the body. The at least one void space may extend from the surface of the electrode. The at least one void space may extend from the exterior of the body to the surface of the electrode. The electrode may be separated from the void space by a layer of material. The void space may be separated from the exterior of the body by a cover. The cover may be perforated. During use, the at least one void space may allow a coolant, such as air, for example, to remove excess heat generated during ozone generation from the electrodes. In embodiments where the coolant is air, the at least one void space may be covered with a gas permeable membrane or layer to protect the electrode from dust or other contaminants, and to ensure that the user is protected from the high voltages running through the electrodes. The void space is preferably in gaseous communication with the exterior of the body. Where the void space is sealed it is typically filled with a gas such as air to conduct heat.

In embodiments comprising a single void space adjacent to each electrode, the single void spaces may extend along at least part way along the length of the adjacent electrode. The single void space may extend half way along the electrode or three quarters of the way along the electrode, for example.

The ozone generator may comprise a third electrode with the second electrode located between the first and third electrodes; wherein the elongate channel extends between the first and second electrodes and the second and third electrodes to direct a gas along the elongate channel between the first and second electrodes in a first direction and then along the elongate channel between the second and third electrodes in a second direction.

The polarity of the second electrode may be opposite to that of the first and third electrodes. The first and third electrodes may be cathodes and the second electrode may be an anode. The first and third electrodes may be anodes and the second electrode may be a cathode. The electrodes may alternate between being anodes and cathodes by the application of an alternating current across them, for example.

The elongate channel may be linear where the elongate channel extends between the first and second electrodes and where the elongate channel extends between the second and third electrodes.

Where the elongate channel extends between the first and second electrodes, the elongate channel may be isolated from at least one of the first and second electrodes by at least one dielectric layer. The elongate channel may be isolated from each of the first and second electrodes by a respective dielectric layer.

Where the elongate channel extends between the second and third electrodes, the elongate channel may be isolated from at least one of the second and third electrodes by at least one dielectric layer. The elongate channel may be isolated from each of the second and third layers by a respective dielectric layer.

Dielectric barrier discharge ozone generators in the art typically comprise a serpentine channel along which oxygen or a gaseous mixture containing oxygen flows between a first and second electrode. Such an arrangement ensures that the oxygen molecules within the gas have as high a chance as possible to be within the volume of the electrical discharge, and therefore potentially react to form ozone.

However, the provision of a serpentine channel between a first and second electrode results in some of the electric field generated between the first and second electrodes being outside the serpentine channel and therefore wasted. Therefore, more energy is required to create this electric field than might otherwise be the case.

The provision of an elongate channel that is linear between the first and second electrodes and between the second and third electrodes ensures that at least the majority of the electric field created between the first and second electrodes and between the second and third electrodes passes through the elongate channel, and therefore through any gas flowing along the elongate channel. Therefore, the amount of energy required to create a given electric field for the ozone generator is lower than that required by an ozone generator with a serpentine channel to create the same given electric field.

In addition, the path length the gas flows along is extended significantly whilst the ozone generator remains compact. Therefore, a longer path length is provided without increasing the length of the body of the ozone generator.

Preferably, the second direction is generally opposed to the first direction.

Preferably, the elongate channel bends around the second electrode about an axis parallel to the width of the elongate channel.

The elongate channel may extend beyond the first and/or second electrode along the length of the elongate channel. The elongate channel may comprise a first linear portion extending between the first and second electrodes and a second linear portion extending between the second and third electrodes. The elongate channel may comprise a bend beyond the first and second electrode connecting the first and second linear portions. The bend may extend around the second electrode. The bend may redirect a gas flowing along the elongate channel between the first and second electrodes in a first direction to flow between the second and third electrodes in a second direction generally opposed to the first direction. The bend may be curved. The bend may be a third linear portion of the elongate channel extending between the first and second linear portions of the elongate channel. In embodiments where the bend is a third linear portion, the bend may direct gas to flow in a direction normal to the direction of flow in the first and second linear portions.

For ozone generators known in the art the direction of flow of a gas along a serpentine channel is generally changed in the plane of the serpentine channel such that the serpentine channel remains in the same plane. As can be seen by inspection of a used serpentine channel, the change of direction results in etching or scoring of the walls of the channel due to the gas molecules flowing around each bend, colliding and or reacting with the outer wall of the channel similar to how the bank of a river is eroded on outer bank of the river as the river flows around a bend. Such collisions deplete the population of ozone molecules within the channel, as these highly reactive molecules react with the wall, for example, reducing the number of ozone molecules that reach the outlet of the ozone generator.

We have found that bending the elongate channel about an axis parallel to the width of the elongate channel advantageously reduces the number of collisions of the molecules within the gas against the wall of the bend and therefore allows a higher proportion of ozone molecules to reach the outlet than would otherwise be the case, resulting in a more efficient ozone generator.

Preferably, the cross-section of the bend is of similar or the same dimensions as those for the first and second linear portions. In embodiments where the bend is curved, the bend comprises a first curved surface on the inside of the bend and a second curved surface on the outside of the bend. The maximum distance between the first and second curved surfaces defines the depth of the bend.

The depth of the bend may be constant. Typically, the length of the first curved surface and the length of the second curved surface extends around the bend of the elongate channel. As the length of the first curved surface is shorter than the length of the second curved surface, molecules travelling adjacent to the first curved surface on the inside of the bend travel a shorter distance than molecules travelling adjacent to the second curved surface on the outside of the bend.

Preferably, the ratio between the length of the first curved surface and the length of the second curved surface may be less than 1:2, preferably, less than 2:3, more preferably, less than 4:5.

The difference in path lengths of the molecules travelling adjacent to the first curved surface and molecules travelling adjacent to the second curved surface may be minimised and therefore, the difference in velocities of the said molecules travelling adjacent to the first and second curved surfaces is minimised. Large differences in velocities may lead to a higher number of molecules colliding with the wall on the outside of the bend and intra-molecular collision. In this way, the number of molecules of ozone lost due to collisions are minimised.

In embodiments where the bend is curved and the radius of curvature is constant, the ratio of the radius of curvature of the first curved surface to that of the second curved surface may be less than 1:2, preferably, less than 2:3, more preferably, less than 4:5. In this way the difference in the radius of curvature of the first and second curved surfaces is significantly less than the average radius of curvature of the channel.

The ozone generator may be formed into a spiral. The first and second electrodes (and the third electrode, where present), and the elongate channel may be formed into a spiral.

The body may be generally planar. The body may be flexible. The first electrode and/or the second electrode (and the third electrode, where present) may be flexible. The body and the first and second electrodes (and the third electrode, where present) may be generally planar and may be flexible.

The ozone generator may be flexible. For example, the ozone generator may be flexed in a first direction to form a cylinder. The ozone generator may be rolled into a spiral, for example.

An ozone generator flexed to form a cylinder may have the inlet located on the outer surface of the cylinder and the outlet located on the inner surface of the cylinder. The outlet on the inner surface may extend around the majority of the inner circumference of the cylinder such that ozone generated within the ozone generator is released into the interior of the cylinder evenly around the inner circumference of the cylinder.

Alternatively, the ozone generator may be rigid and planar, and suitably dimensioned to be inserted into a cylinder such as a pipe or tap, for example.

For example, the water of a water supply may flow through the cylinder and be treated as it passes through the cylinder by ozone generated within the ozone generator. The ozone generator may convert oxygen dissolved in the water of the water supply into ozone, which may then sterilise the water of the said water supply. The ozone generator may electrolyse water to form oxygen which may then be converted into ozone within the ozone generator. The produced ozone may then sterilise the water of the said water supply.

The ozone generator may comprise a plurality of elongate channels. Each elongate channel within the plurality of elongate channels may extend between a first electrode and a second electrode and be in fluid communication with an inlet and an outlet. A plurality of elongate channels may extend between the same first and second electrodes. A plurality of elongate channels may extend between separate first and second electrodes such that each elongate channel extends between a respective first and second electrode.

The ozone generator may comprise a plurality of electrodes and a plurality of elongate channels, whereby the electrodes within the plurality of electrodes are arranged in a stack and each elongate channel within the plurality of elongate channels extends between two adjacent electrodes in the stack. For example, a first elongate channel may extend between a first and second electrode, and a second elongate channel may extend between the second and a third electrode, and so on. Typically, the number of electrodes within the plurality of electrodes will exceed the number of elongate channels within the plurality of elongate channels by one, such that an ozone generator having three electrodes has two elongate channels extending between the three electrodes, for example.

Typically, every other electrode within the plurality of electrodes has the same polarity, opposed to the polarity of the remaining electrodes within the plurality of electrodes. Accordingly, each elongate channel extends between one electrode of each polarity. That is, the upper electrode has the opposite polarity to the bottom electrode for each elongate channel within the plurality of elongate channels.

Each elongate channel within the plurality of elongate channels may have a separate inlet and a separate outlet such that gas introduced to a first inlet will flow along a first elongate channel and exit a first outlet. Alternatively, each elongate channel within the plurality of elongate channels may share a common inlet. The ozone generator may comprise a splitter which extends from the inlet of the ozone generator (the common inlet) to a first end of each elongate channel. The splitter may be integral to the body or a discrete component. Each elongate channel within the plurality of channels may share a common outlet. The ozone generator may comprise a flow combiner which extends from a second end of each elongate channel to the outlet of the ozone generator (the common outlet). The flow combiner may be integral to the body or a discrete component. The splitter and flow combiner are particularly useful in the case of a device in which an array of elongate channels are arranged one above the other in a stack.

The body may comprise at least one cooperating feature and at least one receiving feature, such that the at least one receiving feature of a first ozone generator may receive the at least one cooperating feature of a second ozone generator such that a first ozone generator may be securely mounted on top of a second ozone generator.

For example, the at least one cooperating feature may be a protrusion (for example, a hemisphere raised above the surface of the body and the at least one receiving feature may be a cooperative depression (for example, a hemisphere depression) of suitable dimensions to receive the at least one cooperating feature.

The body may comprise at least two cooperating features and at least two receiving features. The body may comprise at least three cooperating features and at least three receiving features.

The ozone generator according to the present aspect of the invention may be scalable such that a small ozone generator according to the invention may be used to produce small amounts of ozone, and a larger ozone generator according to the invention may be used to produce larger amounts of ozone. For example, a small ozone generator may be used within a water pipe to produce sufficient ozone to sterilise the water passing through the pipe, and a larger ozone generator may be used to sterilise the water supply for a small building.

The invention extends to a second aspect, wherein there is provided a stack of ozone generators comprising a plurality of ozone generators according to the first aspect of the invention.

According to a third aspect of the invention there is provided a method of producing
  ozone for use in water purification comprising the steps of:
    providing an ozone generator according to the first aspect of the invention;
    introducing an oxygen containing gas into the inlet of the ozone generator such that the oxygen containing gas flows from the inlet to the outlet via the elongate channel;
    applying an electric field across the elongate channel sufficient to initiate periodic electrical discharges across the elongate channel;
    wherein the periodic electrical discharges across the elongate channel interact with the oxygen within the oxygen containing gas such that ozone is produced; and
    at least some of the produced ozone flows out of the outlet.

The oxygen containing gas may be air. Preferably, the oxygen containing gas has a high percentage of oxygen. The oxygen containing gas may be at least 80% oxygen. The oxygen containing gas may be at least 90% oxygen. The oxygen containing gas may be at least 95% oxygen.

The amount of ozone produced by an ozone generator within the channel of the ozone generator is directly related to the concentration of oxygen within the said channel. The higher the concentration of oxygen within the channel, the more oxygen molecules that will interact with any electric discharge, and therefore the higher the likelihood that ozone molecules will be produced.

The oxygen containing gas may be introduced into the inlet at a pressure of less than 1 bar. The oxygen containing gas may be introduced into the inlet at a pressure of less than 0.5 bar. The oxygen containing gas may be introduced into the inlet at a pressure of less than 0.1 bar.

In large scale ozone generators, the device is designed to produce the most ozone possible. Accordingly, these large scale ozone generators typically use high pressure oxygen gas forced into a serpentine flow path between two electrodes to have as high a concentration of oxygen molecules as possible between the electrodes. They then typically apply high electric fields to ensure that as many electrical discharges are produced as possible into the high concentration of oxygen molecules.

However, in situations where the amount of ozone required is not large and the amount of energy used to produce the ozone is of greater concern, it may be more important to create just enough ozone to do the intended job at the lowest energy cost.

Whilst a high concentration of oxygen within the channel of the ozone generator may ensure that there is a higher proportion of ozone molecules produced per electrical discharge across the channel, a high concentration of oxygen also results in a higher number of collisions between molecules in the oxygen containing gas. Ozone is a highly reactive species and accordingly, the higher the number of collisions, the higher the likelihood that any given ozone molecule will react to form diatomic oxygen, for example. Therefore, ozone molecules formed towards the inlet of a channel are unlikely to survive to the outlet.

Accordingly, the use of an oxygen containing gas at low pressure (less than 1 bar, for example) allows any ozone molecules formed in the channel to have a better chance to reach the outlet of the ozone generator.

In addition, the use of low pressure oxygen containing gas relieves some of the operating restrictions that are imposed when high pressure gas is used. For example, the elongate channel of the ozone generator does not need to have sufficient structural integrity to retain high pressure oxygen containing gas, nor does the elongate channel need to be sealed, thereby potentially making the ozone generator cheaper to manufacture and easier to use.

In embodiments where the ozone generator is flexible, the ozone generator may be rolled into a cylinder or a spiral prior to the generation of ozone.

The useful charge required to initiate discharges across the depth of the elongate channel between the electrodes may be approximately described by the following equation:

$$\overline{Q} = k \frac{d}{\Delta}$$

Where $\overline{Q}$ is the average charge transferred per microdischarge and can be thought of as the useful charge used to produce ozone, k is a constant proportional to the relative permittivity of the dielectric of the at least one dielectric layers, $\in_r$, ($k \approx 3.1 \times 10^{-11} \in_r$) d is the depth of the elongate channel and $\Delta$ is the total thickness of the at least one dielectric layer.

The voltage applied across the gap may be periodic. The voltage may be applied as a repeating asymmetric waveform. The asymmetric waveform may have a primary peak. The asymmetric waveform may have a one or more secondary peaks subsequent to the primary peak (within each repeat). The secondary peaks may have lower maximum voltage than the primary peak. The secondary peaks may have progressively lower maximum voltages, such that a first secondary peak after the primary peak may have a maximum voltage higher than a subsequent secondary peak.

Discharges across the depth of the elongate channel between the electrodes may coincide with the primary peak of the asymmetric waveform. Discharges across the depth of the elongate channel between the electrodes may coincide with one or more secondary peaks of the asymmetric waveform.

For example, for an ozone generator having a depth of elongate channel of 0.5 mm, and a total dielectric layer thickness of 0.25 mm (two dielectric layers each 0.125 mm), discharges across the depth of the elongate channel may be initiated at a first peak voltage of the asymmetric waveform. The first peak voltage may be between 2 kV and 7 kV. The first peak voltage may be between 3 kV and 6 kV. The first peak voltage may be between 3.5 kV and 5.5 kV.

The frequency of the applied waveform may be between 20 kHz and 5 kHz. The frequency of the applied waveform may be between 15 kHz and 8 kHz. The frequency of the applied waveform may be approximately 10 kHz. The applied waveform may have a pulse width of approximately 10 μm.

The rate of ozone production using the method of the current aspect of the invention may be inversely proportional to the flow rate of the oxygen containing gas flowing along the elongate channel of the ozone generator. The rate of ozone production may be proportional to the length of the elongate channel. The rate of ozone production may be proportional to the length of the elongate channel and inversely proportional to the flow rate of the oxygen gas flowing along the elongate channel.

DESCRIPTION OF THE DRAWINGS

An example embodiment of the present invention will now be illustrated with reference to the following Figures in which.

DETAILED DESCRIPTION OF EXAMPLE EMBODIMENTS

EXAMPLE 1

Figure 1:
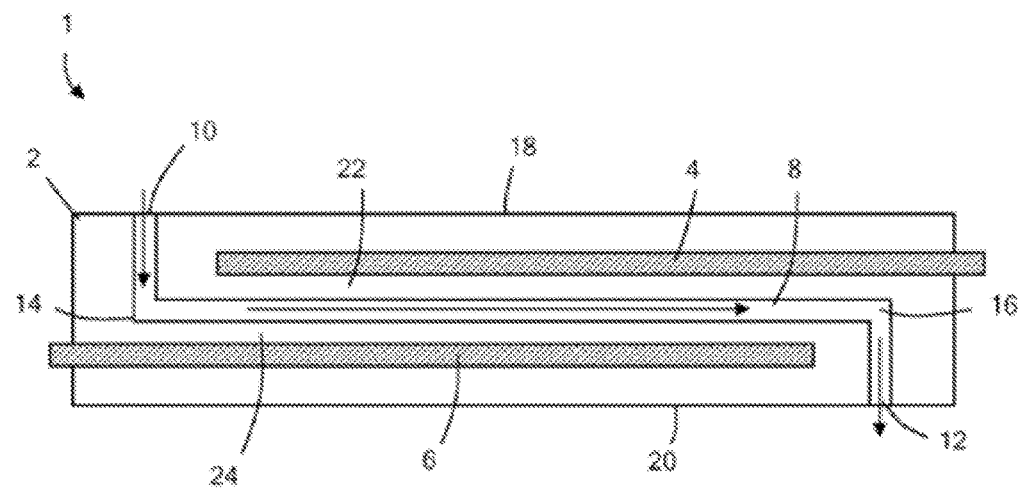
FIG. 1 is a schematic side view of an ozone generator.
Figure 2:
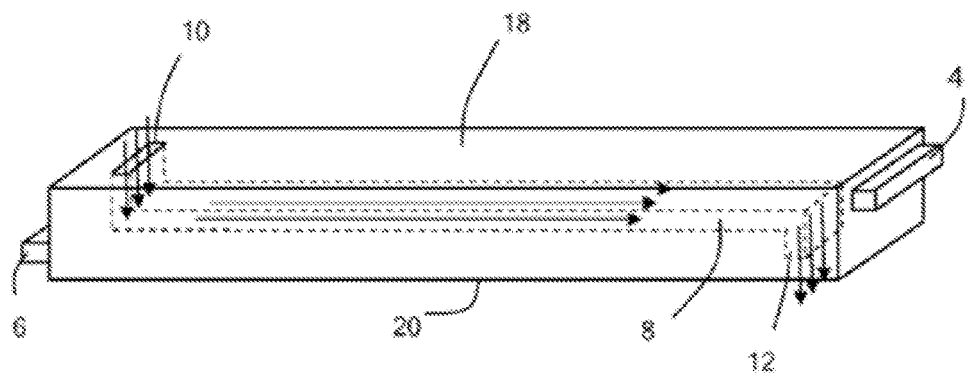
FIG. 2 is a perspective view of an ozone generator from the side.
Figure 3:
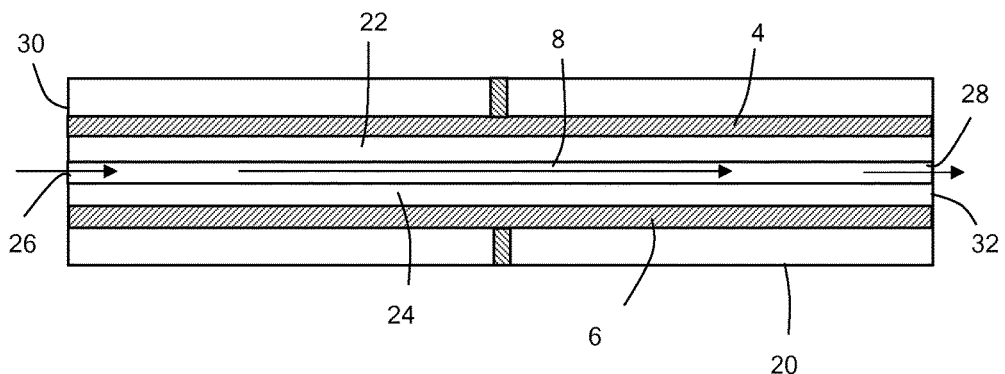
FIG. 3 is a schematic side view of an alternative ozone generator.

With reference to FIGS. 1 to 3, an ozone generator 1 comprises a body 2, the body having a first electrode 4, a second electrode 6, a channel 8 (acting as an elongate channel), an inlet 10 and an outlet 12. The first electrode is arranged above the second electrode. The channel extends between the first and second electrodes and has a first end 14 and a second end 16, the first end in fluid communication with the inlet and the second end in fluid communication with the outlet.

The body of the ozone generator has a top surface 18 (acting as a first surface) and a bottom surface 20 (acting as a second surface). The inlet extends from the top surface of the body to the first end of the channel, and the outlet extends from the second end of the channel to the second surface.

A first polycarbonate sheet 22 and a second polycarbonate sheet 24 (both acting as a dielectric layer) isolate the channel from the first and second electrodes respectively. That is, the first polycarbonate sheet isolates the channel from the first electrode and the second polycarbonate sheet isolates the channel from the second electrode.

During use, oxygen (acting as an oxygen containing gas) is introduced into the inlet and allowed to flow from the inlet to the outlet via the channel. An electric field is applied across the channel between the first and second electrodes. The voltage applied across the gap between the first and second electrodes must be greater than the breakdown voltage of the system. The breakdown voltage is proportional to the distance between the first and second electrodes.

For example, for a system having a channel depth, d, of 1 mm under standard conditions, the approximate resulting breakdown voltage, $V_B$, would be:

$$V_B \approx 4.5 \times 10^6 d = 4.5 \text{ kV}$$

Therefore, an applied voltage of greater than 4.5 kV is required to create discharges across the channel.

In addition, the linear nature of the above equation (i.e. $V_B \propto d$) means that for an ozone generator with a larger gap to produce higher volumes of ozone, a proportionately larger voltage must be applied.

The average charge transferred per discharge across the gap is proportional to the relative permittivity of the dielectric layer, the total thickness of dielectric between the two electrodes and the thickness of the gap.

Whilst the voltage is applied across the channel, periodic electric discharges occur across the channel with a power density following the following equation;

$$W \approx 1.8 \times 10^2 \frac{f \varepsilon_r d^2}{\Delta}$$

where f is the frequency of the power supply, $\varepsilon_r$ is the relative permittivity of the dielectric layer and $\Delta$ is the total depth of the or both dielectric layers. Therefore, for a system applying an alternating voltage with a frequency of 17 kHz, comprising polycarbonate ($\varepsilon_r$=2.9) dielectric layers of total thickness, $\Delta$, 2 mm and a channel depth of 1 mm, the power density of the device is approximately 4.4 kW m$^{-2}$.

Molecules within the volume of the period electrical discharge interact with the electrons within the volume of the electrical discharge, being either ionised (loss of electrons from the molecules) or split (chemical bonds are broken). For example, diatomic oxygen may be ionised to form $O_2^+$, for example, or it may be split into two oxygen atoms, 2Ȯ.

$$e^- + O_2 \rightarrow 2\dot{O} + e^-$$

Oxygen atoms may recombine to reform diatomic oxygen or may react with diatomic oxygen, in the presence of a third collision partner, M, to form ozone, $O_3$. The collision partner is required to absorb some of the energy released by the formation of the new chemical bond to prevent spontaneous decomposition.

$$2\dot{O} \rightarrow O_2$$

$$\dot{O} + O_2 + M \rightarrow O_3$$

Once formed, ozone continues to flow along the channel and exits the ozone generator via the outlet, where it may enter a water supply to react with impurities within the water, for example.

Due to the low pressure the oxygen gas is introduced into the inlet of the ozone generator, the number of collisions experienced by any particular molecule within the oxygen gas is lower than would be the case at higher pressures. Therefore, as chemical reactions can only occur when two or more species are close enough for the interaction of electrons between the species, a higher proportion of the ozone produced within the channel will reach the outlet of the ozone generator than would be the case at higher pressure.

The device of the above embodiment produces ozone efficiently. For example, a device having a channel 15 cm long, 12 mm wide and 0.6 mm deep produced 54 gm$^{-3}$ ozone flowing at a rate of 0.6 to 0.7 Lmin$^{-1}$. A 5 kV potential difference was applied across the depth of the channel at a frequency of 17 kHz. Similar results have been obtained for devices having the same width and depth but with a channel 7.5 cm long and a channel 1.5 cm long.

In an alternative embodiment the inlet 26 and outlet 28 are linear extensions of the channel such that the oxygen gas is introduced into the inlet on one side face 30 of the body and exits the outlet on the opposed side face 32 of the body.

Figure 4:
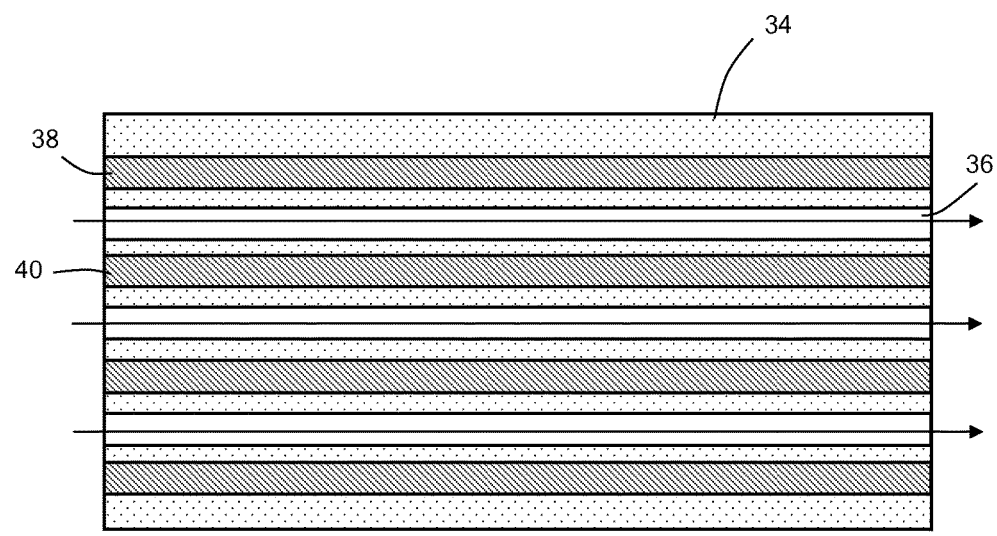
FIG. 4 is a schematic side view of an ozone generator comprising a stack of channels.

With reference to FIG. 4, in an alternative embodiment, the ozone generator comprises a stack of electrodes and elongate channels 34, such that each elongate channel (for example, 36) extends between two electrodes adjacent within the stack (for example, 38 and 40).

Figure 5:
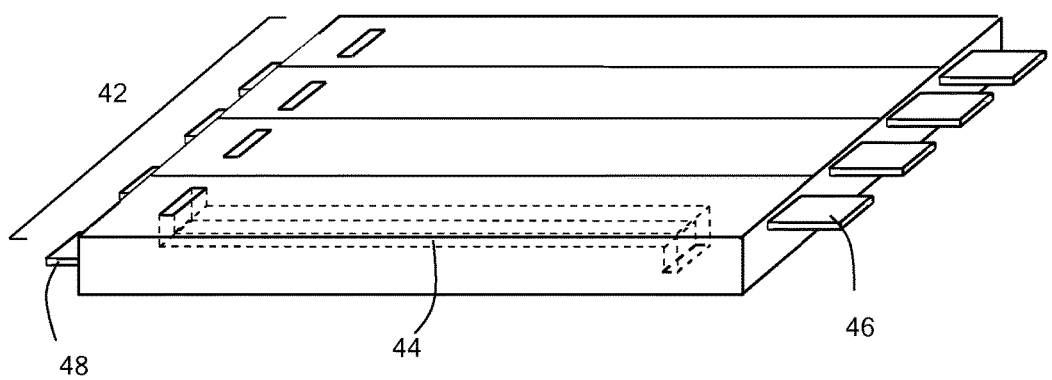
FIG. 5 is a perspective view of an array of ozone generators.

With reference to FIG. 5, in an alternative embodiment, the ozone generator comprises an array of bodies 42 arranged in parallel, each body having a channel 44 extending between a separate first electrode 46 and second electrode 48.

Typical ozone generators comprising heavy duty blocks of aluminium (approximately 4 kg) are able to treat approximately 28 liters of water per second, using 12 watts of power per gram of ozone produced. The device according Example 1 weighing 380 g produces sufficient ozone to treat 13 liters of water per second, using only 3.5 watts of power per gram of ozone produced. Therefore, the ozone generator described in Example 1 above is capable of producing ozone at a much higher efficiency (power used per gram of ozone produced) than existing ozone generator. In addition, due to the relatively low cost of the materials that may be used to construct the above ozone generator (copper electrodes, polypropylene body, polycarbonate dielectric).

In an alternative embodiment, the inlet and the outlet are in the same plane as the elongate channel (see FIG. 3).

Figure 8:
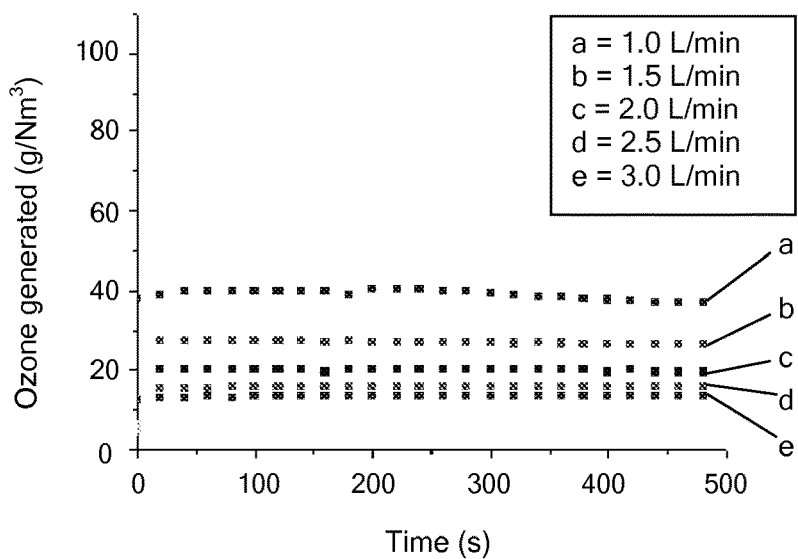
FIG. 8 is a plot of ozone produced as a function of time at a fixed pressure of 200 mbar.
Figure 9:
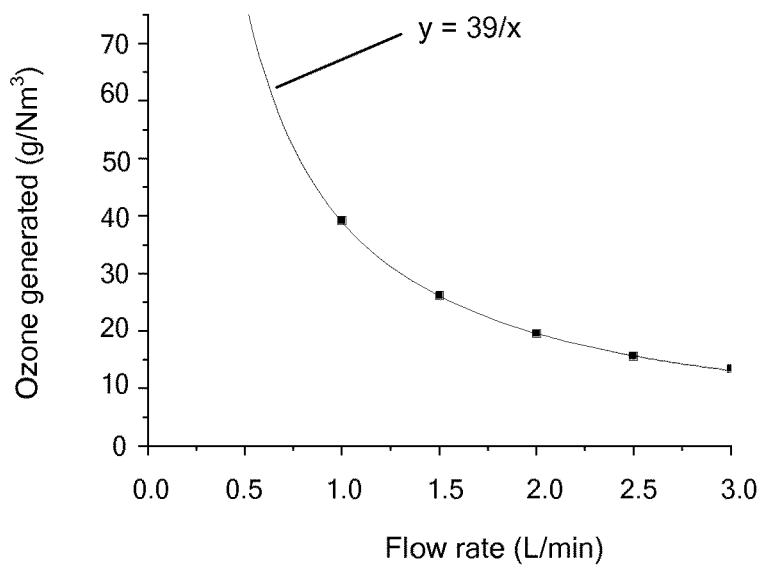
FIG. 9 is a plot of ozone produced as a function of flow rate for a 15 cm elongate channel.

With reference to FIGS. 8 and 9, the device according to the main embodiment has been shown to produce ozone at a constant rate over periods of at least 400 seconds, without any degradation in the rate due to heating of the electrodes. For example, FIG. 8 shows that for oxygen gas flowing along a channel having dimension 15 cm×0.12 cm×0.005 cm, at a rate of 1 L/min at 200 mbar pressure, a constant amount of ozone is produced (approximately 39 g/Nm$^3$). Furthermore, with reference to FIG. 8, when the mean ozone output is plotted as a function of the flow rate at a constant pressure, the data can be fitted by a curve of the equation $$y = \frac{39}{x},$$

where y is the ozone produced and x is the flow rate of the oxygen along the channel. This fit is almost the expected form of fit for a perfect case (which would be fitted by an equation such as $$y = \frac{40}{x}).$$

Therefore, the ozone production of the device of the above example is surprisingly efficient.

Figure 10:
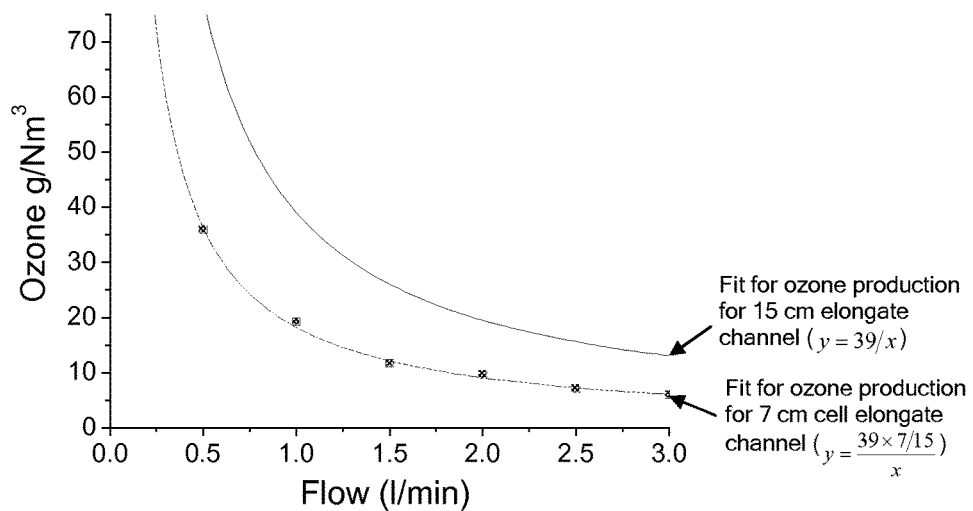
FIG. 10 is a plot of ozone produced as a function of flow rate for a 7 cm elongate channel compared to that for a 15 cm elongate channel.

In addition, it has been found that the ozone produced is proportional to the length of the elongate channel. For example, with reference to FIG. 10, the ozone produced by an ozone generator having a channel 7 cm in length (other dimensions the same as in the previous example) can be fitted by an equation $$y = \frac{39 \times 7/15}{x}$$

and shows that the amount of ozone produced is directly proportional to the length of channel (at least for the channel lengths used so far).

Figure 11:
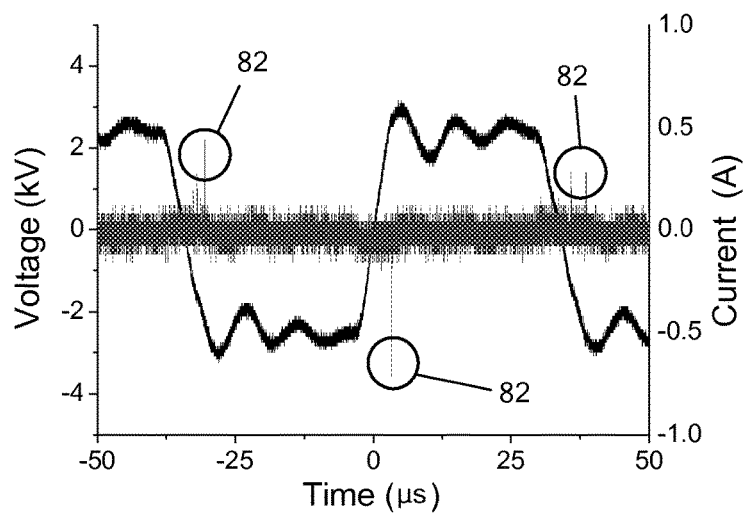
FIG. 11 is a plot of voltage applied across the elongate channel (square waveform) and the measured current across the said channel.
Figure 12:
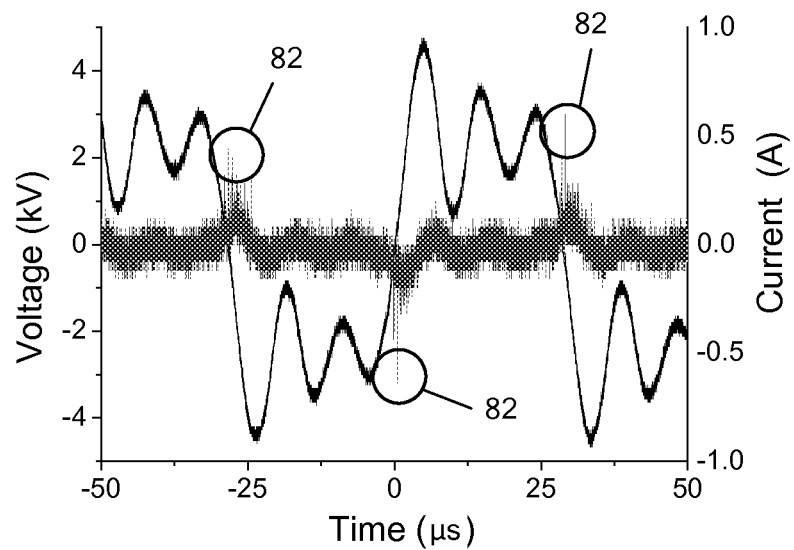
FIG. 12 a plot of voltage applied across the elongate channel and the measured current across the said channel.
Figure 13:
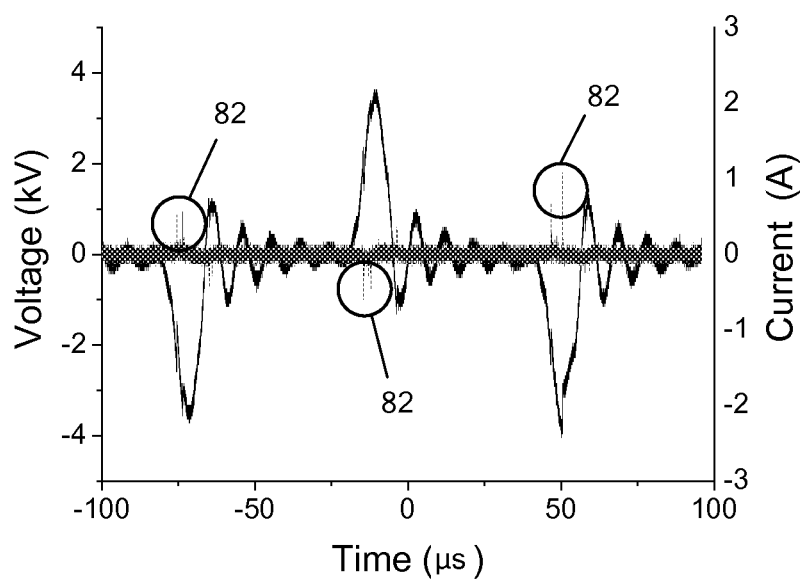
FIG. 13 is a plot of voltage applied across the elongate channel and the measured current across the said channel.

It has been found that the major discharges across the channel occur at the first tallest peak in the waveform of the applied voltage. For example, peaks in current 82 are observed for a number of different waveforms as shown in FIGS. 11 to 13, ranging from an almost square waveform (FIG. 11) to an approximately triangular waveform (FIG. 13).

EXAMPLE 2

Figure 6:
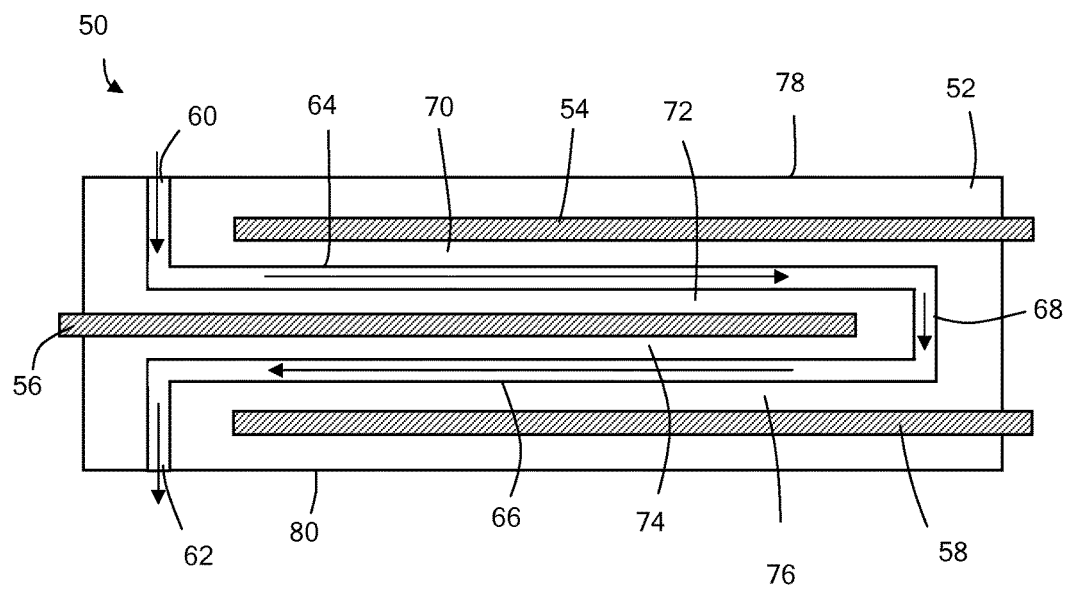
FIG. 6 is a schematic side view of an ozone generator.
Figure 7:
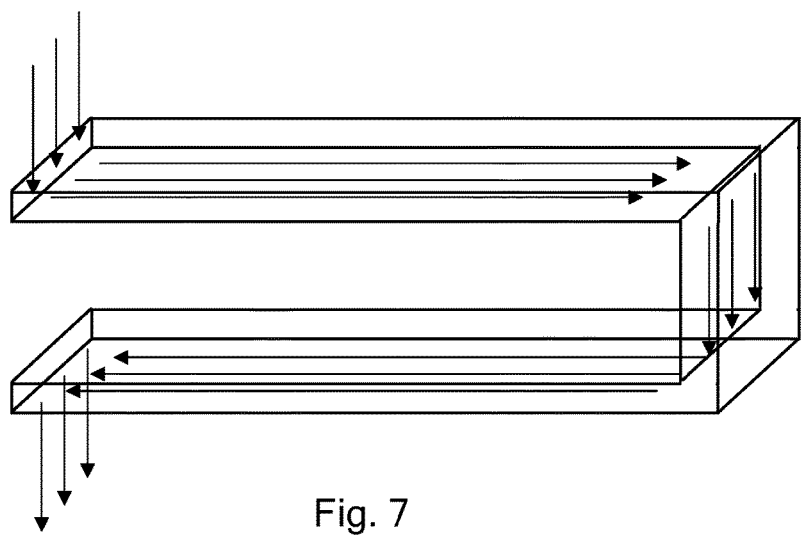
FIG. 7 is a perspective view of the channel of an ozone generator.

With reference to FIGS. 6 and 7, an ozone generator 50 comprises a body 52, the body having a first electrode 54, a second electrode 56, and a third electrode 58 arranged such that the second electrode extends between the first and third electrodes, an inlet 60 and an outlet 62. The body comprises a channel (acting as an elongate channel). The channel has a first linear section 64 extending between the first and second electrodes, a second linear section 66 extending between the second and third electrodes, and a third section 68 (acting as a bend) connecting the first and second linear sections. The channel and the electrodes are arranged so as to form distinct layers arranged in the order; first electrode, first linear section of the channel, second electrode, second linear section of the channel, third electrode. The third section of the channel extends beyond the second electrode across three "layers"; the first linear section of the channel, the second electrode and the second linear section of the channel.

The first linear section of the channel is isolated from the first electrode by a first dielectric layer 70 and is isolated from the second electrode by a second dielectric layer 72. The second linear section of the channel is isolated from the second electrode by a third dielectric layer 74, and isolated from the third electrode by a fourth dielectric layer 76. The four dielectric layers are polycarbonate.

The body has a top surface 78 (acting as a first surface) and a bottom surface 80 (acting as a second surface). The inlet extends from the top surface to the first section of the channel. The outlet extends from the second section of the channel to the bottom surface such that a gas introduced into the inlet may flow to the outlet via the first, third and second sections of the channel sequentially.

During use, oxygen gas is introduced into the inlet and allowed to flow from the inlet to the outlet via the channel. A voltage is applied across the first and second electrodes, and the third and second electrodes. The first and third electrodes are of a first polarity (for example, the cathode) and the second electrode is of a second polarity (for example, the anode).

When a voltage greater then the breakdown voltage of the system is applied across each pair of electrodes, electrical discharges occur across the first and second electrodes through the first section of the channel, and across the second and third electrodes through the second section of the channel and ozone is produced by the same method as for the first embodiment.

EXAMPLE 3

An ozone generator of the first and second examples is formed of flexible materials such that the ozone generator is flexible and rolled up before use to form a spiral or cylinder that may be inserted into a pipe or other water conduit, such that the top surface of the body forms the outer surface of the spiral and the bottom surface of the body forms the inner surface of the spiral.

Further variations and modifications may be made within the scope of the invention herein disclosed.

The invention claimed is:

1. An ozone generator comprising:
   a body;
   a first electrode;
   a second electrode;
   a third electrode, wherein the second electrode is located between the first electrode and the third electrode;
   an elongate channel within the body, a first portion of the elongate channel extending in a first direction between the first and second electrodes, a second portion of the elongate channel in fluid communication with the first portion of the elongate channel and extending in a second direction opposite the first direction and between the second and third electrodes, and a third portion of the elongate channel coupling the first portion of the elongate channel to the second portion of the elongate channel, the third portion of the elongate channel positioned between the first electrode and the third electrode and extending beyond the second electrode about an axis parallel to a width of the elongate channel in a third direction that is normal to the first direction and the second direction; and an inlet and an outlet, wherein the elongate channel is in fluid communication with the inlet and the outlet, wherein the elongate channel is isolated from either or both of the first and second electrodes by at least one dielectric layer such that a voltage when applied across the first electrode and the second electrode generates periodic electrical discharges across the first and second electrodes through the first portion of the elongate channel, wherein the elongate channel is isolated from either or both of the second and third electrodes by at least one additional dielectric layer such that the voltage when applied across the second electrode and the third electrode generates periodic electrical discharges across the second and the third electrodes through the second portion of the elongate channel, and wherein the first portion of the elongate channel extending between the first and second electrodes is configured to direct a gas along the elongate channel between the first and second electrodes in the first direction, and the second portion of the elongate channel extending between the second and third electrodes is configured to receive the gas after the gas passes through the first portion and the third portion of the elongate channel and to direct the gas along the elongate channel between the second and third electrodes in the second direction.

2. An ozone generator according to claim 1, wherein the elongate channel is isolated from each of the first and second electrodes by a respective dielectric layer.

3. An ozone generator according to claim 1, wherein the first and second and third electrodes are planar.

4. An ozone generator according to claim 1, wherein the elongate channel has an aspect ratio (a length dimension to the width dimension) of 2 to 1.

5. An ozone generator according to claim 1, wherein the elongate channel has a generally rectangular cross section throughout the first portion, the second portion and the third portion of the elongate channel.

6. An ozone generator according to claim 5, wherein the depth dimension of the first portion, the second portion and the third portion of the elongate channel is in a range from 0.6 to 4 millimeters and the width dimension is greater than the depth dimension.

7. An ozone generator according to claim 1, wherein the elongate channel comprises at least one linear portion extending between the first and second electrodes or between the second and third electrodes configured to provide a fluid flow through the elongate channel having a Reynolds number in a range from 5,000 to 15,000.

8. An ozone generator according to claim 1, wherein a gas pathway configured to direct the gas along the elongate channel is free of obstructions, the gas pathway comprising a rectangular shape in cross-section throughout the entirety of the first potion, the second portion, and the third portion of the elongate channel.

9. An ozone generator according to claim 1, wherein at least one of first portion and the second portion of the elongate channel has a length dimension in a range for 1.5 to 15 centimeters, the width dimension of 12 millimeters and the depth dimension of 0.6 millimeters.

10. An ozone generator according to claim 1, wherein the body is generally planar having the entirety of the first portion, the second portion, and the third portion of the elongate channel extending within the body and between a top surface and a bottom surface of the body.

11. An ozone generator according to claim 10, wherein the ozone generator is formed of a flexible material comprising polycarbonate and configured to be rolled up to form a spiral or a cylinder.

12. An ozone generator according to claim 1, wherein a first end of the first electrode and a first end of the third electrode extend beyond a first end of the body of the ozone generator, and a first end of the second electrode extends beyond a second end of the body of the ozone generator opposite the first end of the body, wherein the inlet extends from a first planar surface at a top of the body to a first end of the first portion of the elongate channel and adjacent to a second end of the first electrode, and the outlet extends from a second planar surface at a bottom of the body to a second end of the second portion of the elongate channel and adjacent to a second end of the third electrode, and wherein the third portion of the elongate channel is coupled to a second end of the first portion of the elongate channel and to a first end of the second portion of the elongate channel, the third portion of the elongate channel positioned adjacent to a second end of the third electrode.

13. An ozone generator according to claim 1, wherein the body of the ozone generator, the at least one dielectric layer, and the at least one additional dielectric layer are formed of a material comprising a flexible polycarbonate.

14. An ozone generator according to claim 1, wherein the ozone generator is configured to generate ozone at a rate of 39 grams/nanometer$^3$ at the outlet when an oxygen gas flowing at no more than 1 liter/minute and having a pressure of no more than 220 millibars is received at the inlet.

15. An ozone generator according to claim 1, wherein the ozone generator is configured to utilize no more than 3.5 watts of power per gram of ozone produced.

16. A stack of ozone generators comprising:

a plurality of ozone generators, each of the ozone generators comprising:

a body;

a first electrode;

a second electrode;

a third electrode, wherein the second electrode is located between the first electrode and the third electrode;

an elongate channel within the body, a first portion of the elongate channel extending in a first direction between the first and second electrodes, a second portion of the elongate channel in fluid communication with the first portion of the elongate channel and extending in a second direction opposite the first direction and between the second and third electrodes, and a third portion of the elongate channel coupling the first portion of the elongate channel to the second portion of the elongate channel, the third portion of the elongate channel positioned between the first electrode and the third electrode and extending beyond the second electrode about an axis parallel to a width of the elongate channel in a third direction that is normal to the first direction and the second direction; and an inlet and an outlet, wherein the elongate channel is in fluid communication with the inlet and the outlet, wherein the elongate channel is isolated from either or both of the first and second electrodes by at least one dielectric layer such that a voltage when applied across the first electrode and the second electrode generates periodic electrical discharges across the first and second electrodes through the first portion of the elongate channel, wherein the elongate channel is isolated from either or both of the second and third electrodes by at least one additional dielectric layer such that the voltage when applied across the second electrode and the third electrode generates periodic electrical discharges across the second and the third electrodes through the second portion of the elongate channel, and wherein the first portion of the elongate channel extending between the first and second electrodes is configured to direct a gas along the elongate channel between the first and second electrodes in the first direction, and the second portion of the elongate channel extending between the second and third electrodes is configured to receive the gas after the gas passes through the first portion and the third portion of the elongate channel to direct the gas along the elongate channel between the second and third electrodes in the second direction.

17. A method of producing ozone for use in sterilization comprising the steps of:

providing an ozone generator comprising a body, a first electrode, a second electrode, a third electrode, wherein the second electrode is located between the first electrode and the third electrode, an elongate channel within the body, a first portion of the elongate channel extending in a first direction between the first and second electrodes, a second portion of the elongate channel in fluid communication with the first portion of the elongate channel and extending in a second direction opposite the first direction and between the second and third electrodes, and a third portion of the elongate channel coupling the first portion of the elongate channel to the second portion of the elongate channel, the third portion of the elongate channel positioned between the first electrode and the third electrode and extending beyond the second electrode about an axis parallel to a width of the elongate channel in a third direction that is normal to the first direction and the second direction, and an inlet and an outlet, wherein the elongate channel is in fluid communication with the inlet and the outlet, wherein the elongate channel is isolated from either or both of the first and second electrodes by at least one dielectric layer such that a voltage when applied across the first electrode and the second electrode generates periodic electrical discharges across the first and second electrodes through the first portion of the elongate channel, wherein the elongate channel is isolated from either or both of the second and third electrodes by at least one additional dielectric layer such that the voltage when applied across the second electrode and the third electrode generates periodic electrical discharges across the second and the third electrodes through the second portion of the elongate channel, wherein the first portion of the elongate channel extending between the first and second electrodes is configured to direct a gas along the elongate channel between the first and second electrodes in the first direction, and the second portion of the elongate channel extending between the second and third electrodes is configured to receive the gas after the gas passes through the first portion and the third portion of the elongate channel and to direct the gas along the elongate channel between the second and third electrodes in the second direction;

introducing an oxygen containing gas into the inlet of the ozone generator such that the oxygen containing gas flows from the inlet to the outlet via the elongate channel;

applying an electric field across the elongate channel sufficient to initiate the periodic electrical discharges across the elongate channel;

wherein the periodic electrical discharges across the elongate channel interact with the oxygen within the oxygen containing gas such that ozone is produced; and at least some of the produced ozone flows out of the outlet.

18. A method according to claim 17, wherein the oxygen containing gas is at least 90% oxygen.

19. A method according to claim 17, wherein the oxygen containing gas is introduced into the inlet at a pressure of less than 1 bar.

20. A method according to claim 19, wherein the oxygen containing gas is introduced into the inlet at a pressure of less than 0.1 bar.

21. A method according to claim 17, wherein the periodic electrical discharges across the elongate channel are produced when the charge applied across the elongate channel between the electrodes is defined by the following equation:

$$\overline{Q} = k \frac{d}{\Delta}$$

where $\overline{Q}$ is the average charge transferred per microdischarge, k is proportional to the relative permittivity of the dielectric of the at least one dielectric layers, d is the depth of the elongate channel and $\Delta$ is the total thickness of the at least one dielectric layer.

22. A method according to claim 17, wherein the voltage is applied as a repeating asymmetric waveform.

23. A method according to claim 22, wherein the asymmetric waveform has a primary peak and one or more secondary peaks subsequent to the primary peak.

* * * * *